United States Patent
Hou (10) Patent No.: US 9,258,151 B2
(45) Date of Patent: Feb. 9, 2016

(54) RECEIVER IN WIRELESS COMMUNICATION SYSTEM AND DIVERSITY COMBINING METHOD THEREOF

(71) Applicant: ZTE Corporation, Shenzhen, Guangdong (CN)

(72) Inventor: Xiaohui Hou, Shenzhen (CN)

(73) Assignee: ZTE CORPORATION, Shenzhen, Guangdong (CN)

( * ) Notice: Subject to any disclaimer, the term of this patent is extended or adjusted under 35 U.S.C. 154(b) by 0 days.

(21) Appl. No.: 14/428,421

(22) PCT Filed: Sep. 17, 2013

(86) PCT No.: PCT/CN2013/083669
§ 371 (c)(1),
(2) Date: Mar. 16, 2015

(87) PCT Pub. No.: WO2014/044172
PCT Pub. Date: Mar. 27, 2014

(65) Prior Publication Data
US 2015/0229496 A1    Aug. 13, 2015

(30) Foreign Application Priority Data
Sep. 21, 2012    (CN) .......................... 2012 1 0355239

(51) Int. Cl.
*H04B 7/08*    (2006.01)
*H04L 25/03*    (2006.01)
(Continued)

(52) U.S. Cl.
CPC *H04L 25/03* (2013.01); *H04B 7/08* (2013.01); *H04B 7/0857* (2013.01); *H04B 7/10* (2013.01); *H04L 27/0002* (2013.01); *H04L 27/265* (2013.01)

(58) Field of Classification Search
CPC ...... H04B 7/0456; H04B 7/08; H04B 7/0837; H04B 7/0842; H04B 7/0857; H04B 7/0862; H04B 7/0865; H04B 7/0868
See application file for complete search history.

(56) References Cited

U.S. PATENT DOCUMENTS 5,563,907 A * 10/1996 Lomp ........................... 375/142
2003/0114194 A1 * 6/2003 Hiramatsu .................... 455/562

(Continued)

FOREIGN PATENT DOCUMENTS

| CN | 101340217 A | 1/2009 |
| CN | 102325357 A | 1/2012 |
| WO | 2011133703 A2 | 10/2011 |

OTHER PUBLICATIONS

International Search Report in international application No. PCT/CN2013/083669, mailed on Dec. 26, 2013.

(Continued)

*Primary Examiner* — Siu Lee
(74) *Attorney, Agent, or Firm* — Oppedahl Patent Law Firm LLC (57) ABSTRACT

A diversity combining method applied by a receiver in a wireless communication system is provided, including: acquiring baseband signals of receiving channels corresponding to multiple receiving antennas, and combining multiple acquired baseband signals according to a Maximal-Ratio Combining (MRC) principle at an intermediate frequency and/or within an equalizer and/or after the equalizer. Further a receiver in a wireless communication system is provided. By means of the technical solutions of the disclosure, it is possible to improve a demodulation threshold and the demodulation sensitivity of a microwave system.

8 Claims, 5 Drawing Sheets

(51) Int. Cl.
*H04B 7/10* (2006.01)
*H04L 27/00* (2006.01)
*H04L 27/26* (2006.01)

(56) References Cited

U.S. PATENT DOCUMENTS

| | | |
|---|---|---|
| 2007/0211619 A1* | 9/2007 | Jalloul et al. ............... 370/209 |
| 2009/0245090 A1* | 10/2009 | Budianu et al. ............. 370/210 |
| 2011/0195657 A1* | 8/2011 | Takeda et al. ............... 455/7 |
| 2011/0256899 A1 | 10/2011 | Mehyar |
| 2011/0310948 A1* | 12/2011 | Ramesh et al. ............. 375/229 |
| 2012/0294399 A1* | 11/2012 | Anandakumar et al. ..... 375/349 |
| 2013/0077718 A1* | 3/2013 | Chavali ...................... 375/340 |
| 2013/0188579 A1* | 7/2013 | Touboul et al. ............. 370/329 |

OTHER PUBLICATIONS

English Translation of the Written Opinion of the International Search Authority in international application No. PCT/CN2013/083669, mailed on Dec. 26, 2013.

Partial Supplementary European Search Report in European application No. 13838973.9, mailed on Nov. 25, 2015.

Adaptive beamforming method based on closed-loop power control for DS-CDMA receiver in multippath fading channels, mailed on Sep. 26, 2010.

Iterative Multiuser Detection, Macrodiversity Combining, and Decoding for the TDMA Cellular Uplink, mailed on Aug. 1, 2001.

* cited by examiner

RECEIVER IN WIRELESS COMMUNICATION SYSTEM AND DIVERSITY COMBINING METHOD THEREOF

TECHNICAL FIELD

The disclosure relates to the technical field of communications, and in particular to a receiver in a wireless communication system and a diversity combining method thereof.

BACKGROUND

There is multipath fading in a wireless communication system, and fading experienced by different paths is generally uncorrelated; generally, it is possible to improve equalized demodulation performance of a system using diversity combining techniques.

Figure 1:
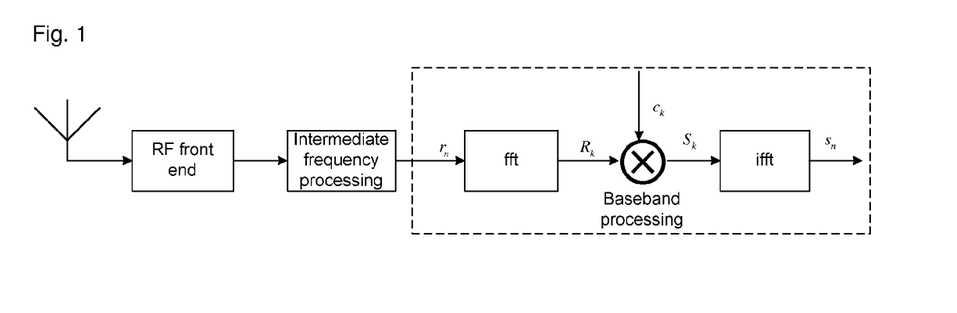
FIG. 1 is a basic structural block diagram of a traditional SISO microwave system.
Figure 2:
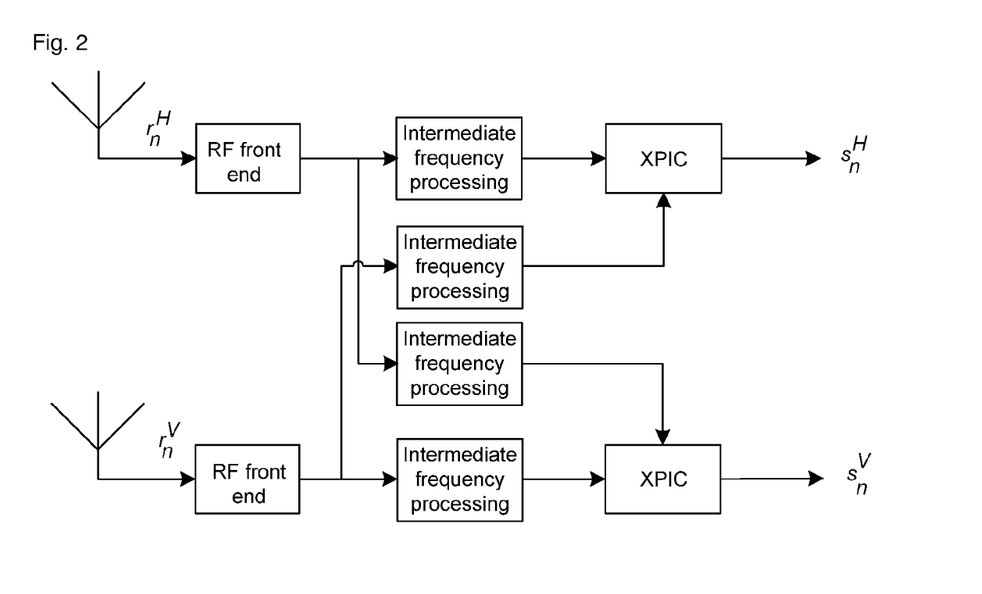
FIG. 2 is a basic structural block diagram of a traditional microwave system using an XPIC.

In an existing microwave system, as shown in FIG. 1 and FIG. 2, it involves only Single Input Single Output (SISO) and the application of Cross-Polarisation Interference Counteracter (XPIC), but does not involve diversity combining techniques and related applications.

SUMMARY

In view of the above, the embodiments of the disclosure to provide various types receivers in a wireless communication system and diversity combining methods thereof, which can improve a demodulation threshold and the demodulation sensitivity of a microwave system.

To this end, the technical solutions of embodiments of the disclosure are implemented as follows.

A diversity combining method applied by a receiver in a wireless communication system, includes:

acquiring baseband signals of receiving channels corresponding to multiple receiving antennas; and combing the acquired baseband signals according to a Maxima-Ratio Combining (MRC) principle a an intermediate frequency or within an equalizer or after the equalizer.

In an embodiment, the acquired baseband signals of the receiving channels corresponding to the multiple receiving antennas may be baseband signals processed by matched filtering.

A receiver in a wireless communication system, includes:

a combination module configured to acquire baseband signals of receiving channels corresponding to multiple receiving antennas and combine, according to a Maximal-Ratio Combining (MRC) principle the acquired baseband signals at an intermediate frequency processing module or within an equalizer or after the equalizer.

In an embodiment, the receiver in a wireless communication system may further include an intermediate frequency processing module configured to perform matched filtering processing on the baseband signals of the receiving channels corresponding to the multiple receiving antennas, which are acquired from an RF front end, and transmit processed signals to the combination module.

A diversity combining method applied by a receiver in a wireless communication system, includes:

acquiring baseband signals of receiving channels corresponding to multiple receiving antennas; and obtaining a diversity combined baseband signal according to a Maximal-Ratio Combining (MRC) principle using a formula:

$$r_n = \sum_{i=1}^{L} SNR_i r_n^{(i)};$$

wherein $r_n$ represents respective the diversity combined baseband signal, $SNR_i$ represents an SNR of a received signal corresponding to an ith receiving antenna, and $r_n^{(i)}$ represents a baseband signal of a receiving channel corresponding to the ith receiving antenna.

In an embodiment, the acquired baseband signals of the receiving channels corresponding to the multiple receiving antennas may be baseband signals processed by matched filtering.

A receiver in a wireless communication system, includes:

a first combination module configured to acquire baseband signals of receiving channels corresponding to multiple receiving antennas, and obtain, according to a Maximal-Ratio Combining (MRC) principle, a diversity combined baseband signal using a formula:

$$r_n = \sum_{i=1}^{L} SNR_i r_n^{(i)};$$

wherein $r_n$ represents the diversity combined baseband signal, $SNR_i$ represents an SNR of a received signal corresponding to an ith receiving antenna, and $r_n^{(i)}$ represents a baseband signal of a receiving channel corresponding to the ith receiving antenna.

In an embodiment, the receiver in a wireless communication system may further include a first intermediate frequency processing module configured to perform matched filtering processing on the baseband signals of the receiving channels corresponding to the multiple receiving antennas, which are acquired from an RF front end, and transmit processed signals to the first combination module.

A diversity combining method applied by a receiver in a wireless communication system, includes:

performing intermediate frequency processing and matched filtering processing on a baseband signal of a receiving channel corresponding to an ith receiving antenna to obtain a time domain baseband signal $r_n^{(i)}$, wherein i=1, ..., L;

performing Fast Fourier Transform (FFT) on $r_n^{(i)}$ to obtain a frequency domain signal $R_k^{(i)}$; and performing combination within a frequency-domain equalization module according to a Maximal-Ratio Combining (MRC) principle using a formula below to obtain a FFT value $S_k$ of a transmitted symbol:

$$S_k = \sum_{i=1}^{L} c_k^{(i)} R_k^{(i)};$$

wherein $c_k^{(i)}$ is a coefficient when FFT is performed on the transmitted symbol.

In an embodiment, the method may further include:

performing Inverse Fast Fourier Transform (IFFT) on $S_k$ to convert the frequency domain signal to the time domain signal, thus obtaining an equalized signal $S_n$.

A receiver in an wireless communication system, includes:

a second intermediate frequency processing module configured to perform intermediate frequency processing and matched filtering processing on a baseband signal of a receiving channel corresponding to an ith receiving antenna to obtain a time domain baseband signal $r_n^{(i)}$, wherein i=1, ..., L;

a first FFT module configured to perform FFT on $r_n^{(i)}$ to obtain a frequency domain signal $R_k^{(i)}$; and a second combination module configured to perform combination within a frequency-domain equalization module according to a Maximal-Ratio Combining (MRC) principle using a formula below to obtain a FFT value $S_k$ of a transmitted symbol:

$$S_k = \sum_{i=1}^{L} c_k^{(i)} R_k^{(i)};$$

wherein $c_k^{(i)}$ is a coefficient when FFT is performed on the transmitted symbol.

In an embodiment, the receiver in a wireless communication system may further include:

a first IFFT module configured to perform IFFT on $S_k$ to convert the frequency domain signal to the time domain signal, thus obtaining an equalized signal $s_n$.

A diversity combining method applied by a receiver in a wireless communication system, includes:

performing independent frequency-domain equalization on a received signal of an ith receiving antenna to obtain an equalized signal $s_k^{(i)}$;

performing IFFT the equalized signal $s_k^{(i)}$ to obtain a time domain signal $s_n^{(i)}$; and combining the time domain signal $s_n^{(i)}$ in time domain according to a Maximal-Ratio Combining (MRC) principle using a formula below:

$$s_n = \sum_{i=1}^{L} b^{(i)} s_n^{(i)};$$

wherein $b^{(i)}$ is a weighted coefficient for the combination.

A receiver in a wireless communication system, includes:

a frequency-domain equalization module configured to perform independent frequency-domain equalization on a received signal of an ith receiving antenna to obtain an equalized signal $s_k^{(i)}$;

a second IFFT module configured to perform IFFT on the equalized signal $s_k^{(i)}$ to obtain a time domain signal $s_n^{(i)}$; and a third combination module configured to combine the time domain signal $s_n^{(i)}$ in time domain according to an MRC principle using a formula below:

$$s_n = \sum_{i=1}^{L} b^{(i)} s_n^{(i)};$$

wherein $b^{(i)}$ is a weighted coefficient for the combination.

In the embodiments of the disclosure, baseband signals of receiving channels corresponding to multiple receiving antennas are acquired, and multiple acquired baseband signals are combined according to a Maximal-Ratio Combining (MRC) principle at an intermediate frequency or within an equalizer or after the equalizer, in this way, it is possible to obtain a MRC diversity gain of 3 dB or more, and have great performance improvement in, noise suppression.

DETAILED DESCRIPTION

The technical solutions of the disclosure will be further elaborated below in combination with specific embodiments and accompanying drawings so that those skilled in the art can better understand the disclosure and put it into practice, but the embodiments given herein are not intended to limit the disclosure.

Embodiment 1

Figure 3:
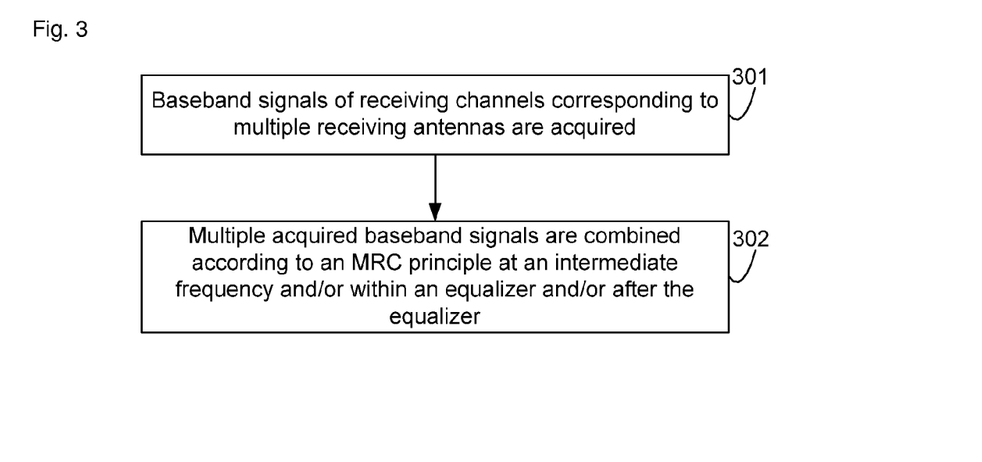
FIG. 3 is a schematic flow chart of a diversity combining method performed at a microwave system front end according to a first embodiment of the disclosure.

The embodiment describes a diversity combining method applied by a receiver in a wireless communication system, as shown in FIG. 3, the method includes:

step 301, baseband signals of receiving channels corresponding to multiple receiving antennas are acquired; and step 302, the multiple acquired baseband signals are combined according to a Maximal-Ratio Combining (MRC) principle at an intermediate frequency or within an equalizer or after the equalizer.

Preferably, the acquired baseband signals of the receiving channels corresponding to the receiving antennas may be baseband signals processed by matched filtering.

Figure 4:
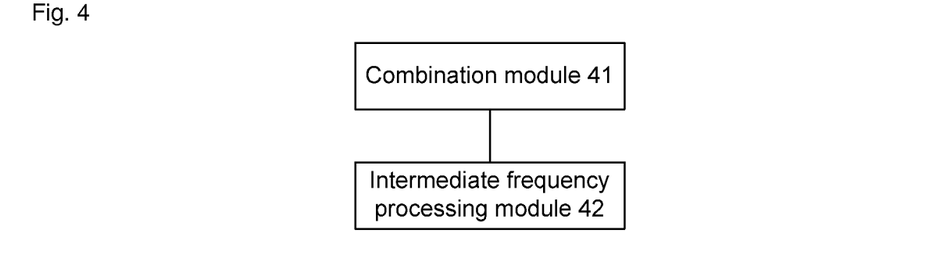
FIG. 4 is a schematic structural diagram of a receiver in a wireless communication system according to a first embodiment of the disclosure.

The embodiment further describes a receiver in a wireless communication system, as shown in FIG. 4, the receiver in a wireless communication system includes:

a combination module 41 configured to acquire baseband signals of receiving channels corresponding to multiple receiving antennas and combine, according to a Maximal- Ratio Combining (MRC) principle, the multiple acquired baseband signals at an intermediate frequency or within an equalizer or after the equalizer.

Preferably, the receiver in a wireless communication system may further include an intermediate frequency processing module 42 configured to perform matched filtering processing on the baseband signals of the receiving channels corresponding to the receiving antennas, which are acquired from an RF front end, and transmit processed signals to the combination module.

In practical applications, the combination module 41 of the receiver in a wireless communication system may be implemented by a Central Processing Unit (CPU), a Digital Signal Processor (DSP) or a Field Programmable Gate Array (FPGA) of the receiver in the wireless communication system; the intermediate frequency processing module 42 of the receiver in the wireless communication system may be implemented by a matched filter.

Embodiment 2

Figure 5:
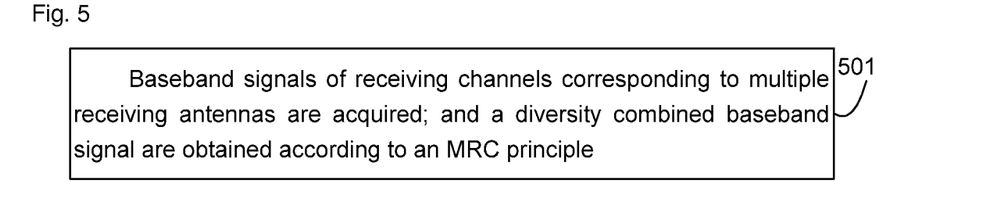
FIG. 5 is a schematic flow chart of a diversity combining method performed at a microwave system front end according to a second embodiment of the disclosure.
Figure 11:
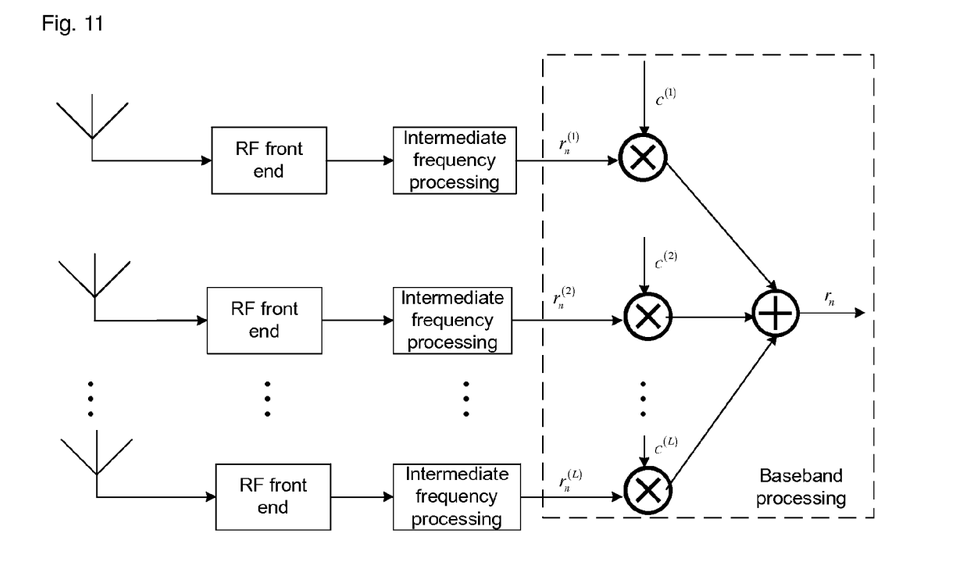
FIG. 11 is a schematic diagram of a combination performed at a front end according to a second embodiment of the disclosure.

The embodiment describes a diversity combining method performed at a microwave system front end, as shown in FIG. 5 and FIG. 11, the method includes:

step 501, baseband signals of receiving channels corresponding to multiple receiving antennas are acquired; and a diversity combined baseband signal is obtained according to a Maximal-Ratio Combining (MRC) principle using a formula:

$$r_n = \sum_{i=1}^{L} SNR_i r_n^{(i)};$$

wherein $r_n$ represents the diversity combined baseband signal, $SNR_i$ represents an SNR of a received signal corresponding to an ith receiving antenna, and $r_n^{(i)}$ represents a baseband signal of a receiving channel corresponding to the ith receiving antenna.

Specifically, in step 501, the acquired baseband signals of the receiving channels corresponding to the receiving antennas are baseband signals processed by matched filtering.

Specifically, the processing after the combination may be performed according to a traditional method (the processing method as shown in FIG. 1); here frequency-domain equalization is illustrated just as an example, various equalization methods such as time-domain equalization may also be used in practical applications, and there is no limitation to the equalization method.

Figure 6:
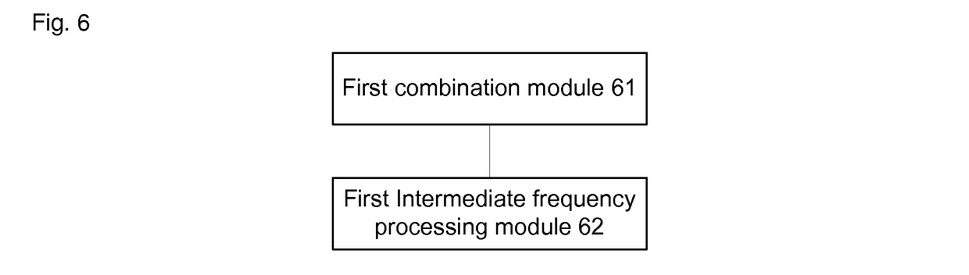
FIG. 6 is a schematic structural diagram of a receiver in a wireless communication system according to a second embodiment of the disclosure.

Referring to FIG. 6 and FIG. 11, the embodiment provides another receiver in a wireless communication system, and the receiver includes:

a first combination module 61 configured to acquire baseband signals of receiving channels corresponding to multiple receiving antennas, and obtain, according to a Maximal-Ratio Combining (MRC) principle, a diversity combined baseband signal using a formula:

$$r_n = \sum_{i=1}^{L} SNR_i r_n^{(i)};$$

wherein $r_n$ represents the diversity combined baseband signal, $SNR_i$ represents an SNR of a received signal corresponding to an ith receiving antenna, and $r_n^{(i)}$ represents the baseband signal of the receiving channel corresponding to the ith receiving antenna.

In an embodiment, the receiver in a wireless communication system may further include:

a first intermediate frequency processing module 62 configured to perform matched filtering processing on the baseband signals of the receiving channels corresponding to the receiving antennas, which are acquired from an RF front end, and transmit processed signals to the first combination module.

Similarly, the processing after the combination may be performed according to a traditional method (the processing method as shown in FIG. 1); here frequency-domain equalization is illustrated just as an example, various equalization methods such as time-domain equalization may also be used in practical applications, and there is no limitation to the equalization method.

In practical applications, the first combination module 61 of the receiver in a wireless communication system may be implemented by a CPU, a DSP or an FPGA of the receiver in the wireless communication system; the first intermediate frequency processing module 62 of the receiver in the wireless communication system may be implemented by a matched filter.

Embodiment 2

Figure 7:
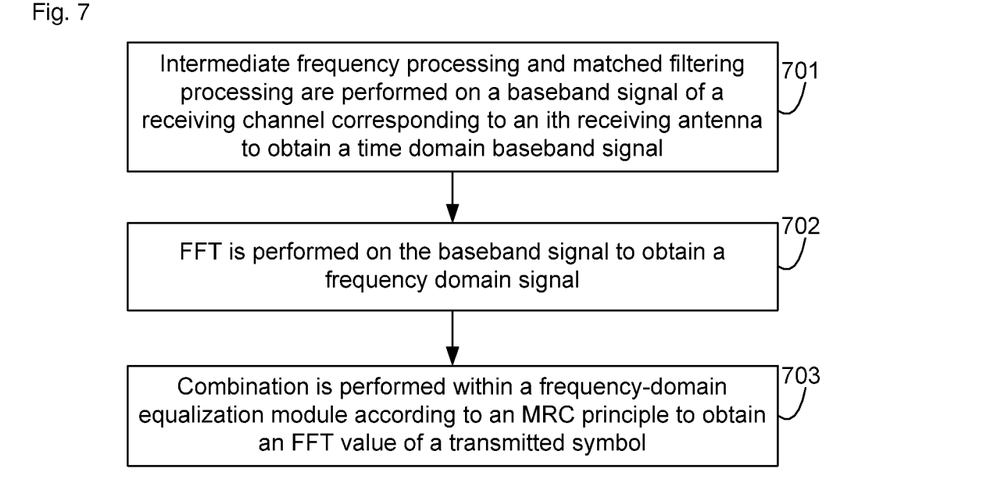
FIG. 7 is a schematic flow chart of a diversity combining method performed at a microwave system front end according to a third embodiment of the disclosure.
Figure 12:
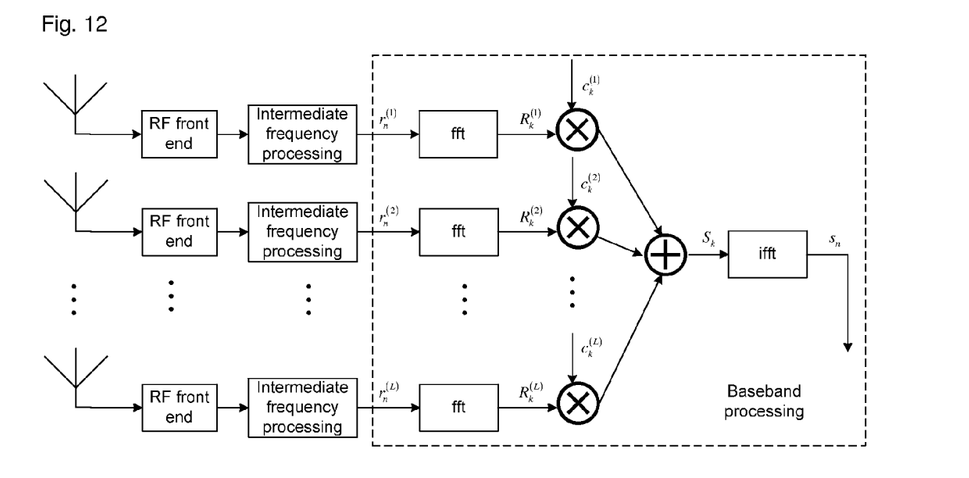
FIG. 12 is a schematic diagram of a combination performed within an equalizer according to a third embodiment of the disclosure.

The embodiment describes a diversity combining method performed at within an equalizer, as shown in FIG. 7 and FIG. 12, the method includes:

step 701, intermediate frequency processing and matched filtering processing are performed on a baseband signal of a receiving channel corresponding to an ith receiving antenna to obtain a time domain baseband signal $r_n^{(i)}$, wherein i=1, ..., L;

step 702, FFT is performed on $r_n^{(i)}$ to obtain a frequency domain signal $R_k^{(i)}$; and step 703, combination is performed within a frequency-domain equalization module according to a Maximal-Ratio Combining (MRC) principle using below formula to obtain a FFT value $S_k$ of a transmitted symbol:

$$S_k = \sum_{i=1}^{L} c_k^{(i)} R_k^{(i)};$$

wherein $c_k^{(i)}$ is a coefficient when FFT is performed on the transmitted symbol.

Preferably, an optimal coefficient for united equalization and MRC may be obtained according to a minimum error principle and using a formula below:

$$c_k^{(i)} = \frac{\left(\frac{\sigma_d}{\sigma_n^{(i)}}\right)^2 (H_k^{(i)})^*}{1 + \sum_{l=1}^{L} \left(\left(\frac{\sigma_d}{\sigma_n^{(l)}}\right)^2 |H_k^{(l)}|^2\right)};$$

wherein $H_k^{(i)}$ is a frequency domain response of a channel corresponding to the $i$th antenna.

In an embodiment, the method may further include:

IFFT is performed on $S_k$ so as to convert the frequency domain signal to the time domain signal, thus obtaining an equalized signal $s_n$.

For a time-domain equalizer, similar deduction may be made.

$$R_k^{(i)} = H_k^{(i)} S_k + N_k^{(i)}, \ i=1,2,\ldots,L; \ k=0,1,\ldots,N-1$$

wherein $R_k^{(i)}$ is FFT of a received signal of the ith receiving antenna; $H_k^{(i)}$ is a frequency domain response of a channel corresponding to the ith receiving antenna;

$S_k$ is FFT of a transmitted symbol; and $N_k^{(i)}$ is FFT of noises.

It is assumed that the combination process is combined with frequency equalization within the frequency-domain equalization module according to the MRC principle, here if $$S_k = \sum_{i=1}^{L} c_k^{(i)} R_k^{(i)};$$

$\epsilon(k) = E[|R_k - S_k|^2]$ is defined;
then $\epsilon(k)$ may be minimized to obtain:

$$c_k^{(i)} = \frac{\left(\frac{\sigma_d}{\sigma_n^{(i)}}\right)^2 (H_k^{(i)})^*}{1 + \sum_{l=1}^{L}\left(\left(\frac{\sigma_d}{\sigma_n^{(l)}}\right)^2 |H_k^{(l)}|^2\right)};$$

IFFT is performed on $S_k$ to obtain a signal $s_n = \text{ifft}(S_k)$ which is output from the equalizer.

More specifically, the diversity combination performed within the equalizer includes steps of:

1) intermediate frequency processing and matched filtering processing are performed on a baseband signal of a receiving channel corresponding to an ith receiving antenna to obtain a time domain baseband signal $r_n^{(i)}$, wherein $i=1, \ldots, L$;

2) FFT is performed on $r_n^{(i)}$ to obtain a frequency domain signal $R_k^{(i)}$;

3) an optimal coefficient for united equalization and MRC is obtained according to a minimum error principle and using a formula below:

$$c_k^{(i)} = \frac{\left(\frac{\sigma_d}{\sigma_n^{(i)}}\right)^2 (H_k^{(i)})^*}{1 + \sum_{l=1}^{L}\left(\left(\frac{\sigma_d}{\sigma_n^{(l)}}\right)^2 |H_k^{(l)}|^2\right)};$$

4) MRC is performed within the frequency-domain equalization module;

$$S_k = \sum_{i=1}^{L} c_k^{(i)} R_k^{(i)};$$

5) IFFT is performed on $S_k$ so as to convert the frequency domain signal to the time domain signal, thus obtaining an equalized signal $s_n$.

Figure 8:
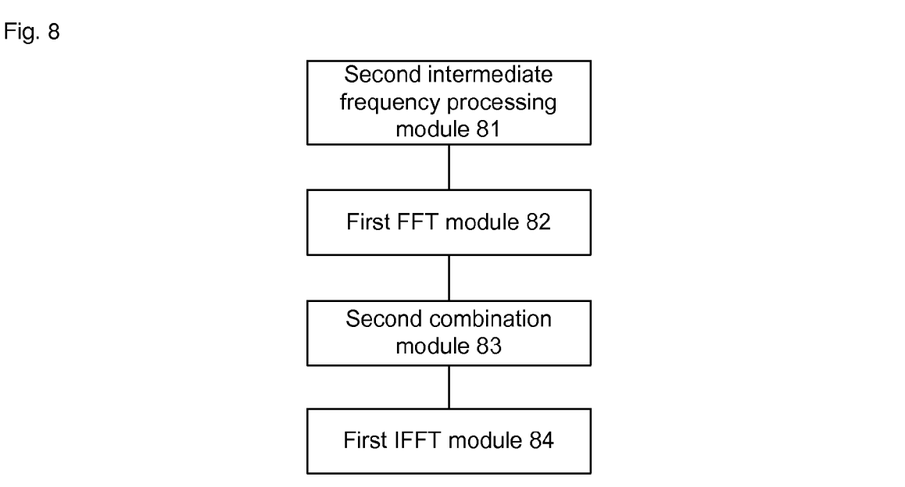
FIG. 8 is a schematic structural diagram of a receiver in a wireless communication system according to a third embodiment of the disclosure.

Accordingly, as shown in FIG. 8 and FIG. 12, the embodiment further provides a receiver in a wireless communication system, and the receiver includes:

a second intermediate frequency processing module 81 configured to perform intermediate frequency processing and matched filtering processing on a baseband signal of a receiving channel corresponding to an ith receiving antenna to obtain a time domain baseband signal $r_n^{(i)}$, wherein $i=1, \ldots, L$;

a first FFT module 82 configured to perform FFT on $r_n^{(i)}$ to obtain a frequency domain signal $R_k^{(i)}$; and a second combination module 83 configured to perform combination within a frequency-domain equalization module according to an MRC principle using a formula below to obtain an FFT value $S_k$ of a transmitted symbol:

$$S_k = \sum_{i=1}^{L} c_k^{(i)} R_k^{(i)};$$

wherein $c_k^{(i)}$ is a coefficient when FFT is performed on the transmitted symbol.

Preferably, an optimal coefficient for united equalization and MRC is obtained according to a minimum error principle and using a formula:

$$c_k^{(i)} = \frac{\left(\frac{\sigma_d}{\sigma_n^{(i)}}\right)^2 (H_k^{(i)})^*}{1 + \sum_{l=1}^{L}\left(\left(\frac{\sigma_d}{\sigma_n^{(l)}}\right)^2 |H_k^{(l)}|^2\right)};$$

wherein $H_k^{(i)}$ is a frequency domain response of a channel corresponding to the $i$th antenna.

In an embodiment, the receiver in a wireless communication system may further include:

a first IFFT module 84 configured to perform IFFT on $S_k$ so as to convert the frequency domain signal to the time domain signal, thus obtaining an equalized signal $s_n$.

In practical applications, the second intermediate frequency processing module 81 of the receiver in a wireless communication system may be implemented by a matched filter; the first FFT module 82, the second combination module 83 and the first IFFT module 84 of the receiver in the wireless communication system may be implemented by a CPU, a DSP or an FPGA of the receiver in the wireless communication system.

Embodiment 3

Figure 9:
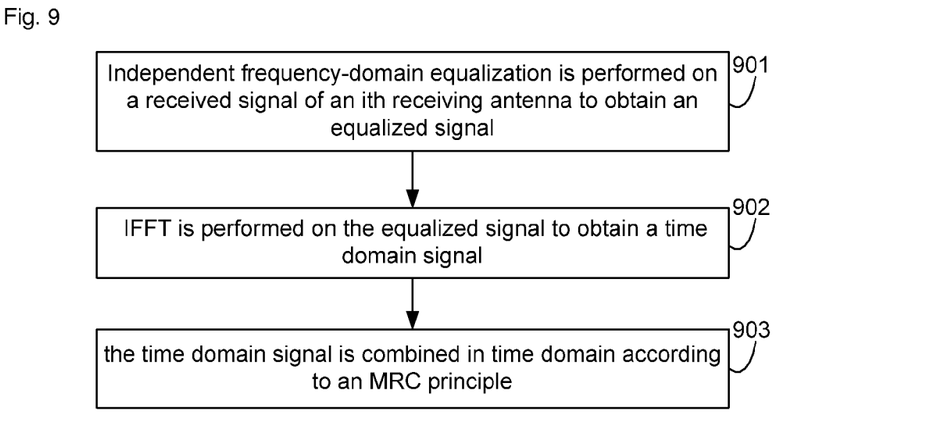
FIG. 9 is a schematic flow chart of a diversity combining method performed at a microwave system front end according to a fourth embodiment of the disclosure.
Figure 13:
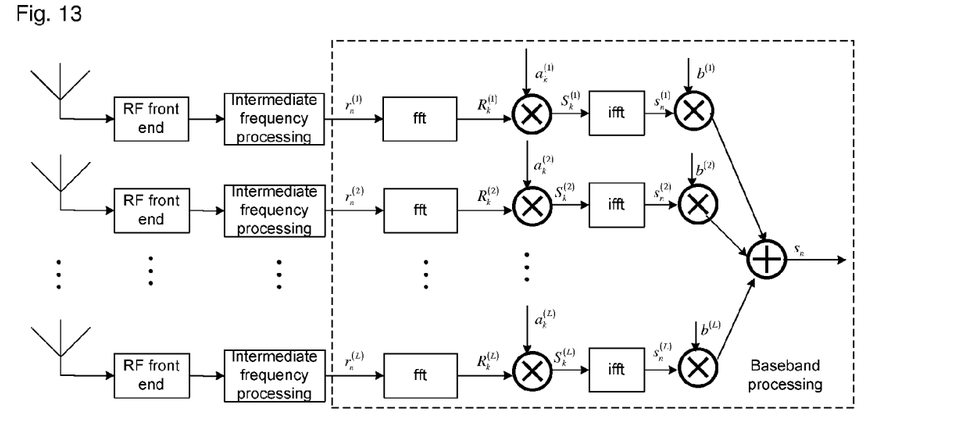
FIG. 13 is a schematic diagram of a combination performed at a back end according to a fourth embodiment of the disclosure.

The embodiment describes a diversity combining method performed at a microwave system back end, as shown in FIG. 9 and FIG. 13, the method includes:

step 901, independent frequency-domain equalization is performed on a received signal of an ith receiving antenna to obtain an equalized signal $s_k^{(i)}$;

step 902, IFFT is performed on the equalized signal $s_k^{(i)}$ to obtain a time domain signal $s_n^{(i)}$; and step 903, the time domain signal $s_n^{(i)}$ is combined in time domain according to an MRC principle using a formula below:

$$s_n = \sum_{i=1}^{L} b^{(i)} s_n^{(i)};$$

wherein $b^{(i)}$ is a weighted coefficient for combination.

In the embodiment, frequency-domain equalization is performed firstly on the received signal of each antenna, then equalized signals are combined in time domain.

$d_k^{(i)}$ is an equalization coefficient of the received signal of the ith antenna corresponding to the frequency-domain equalization module.

Then a finally obtained signal is expressed by a formula:

$$s_n = \sum_{i=1}^{L} b^{(i)} s_n^{(i)}.$$

Figure 10:
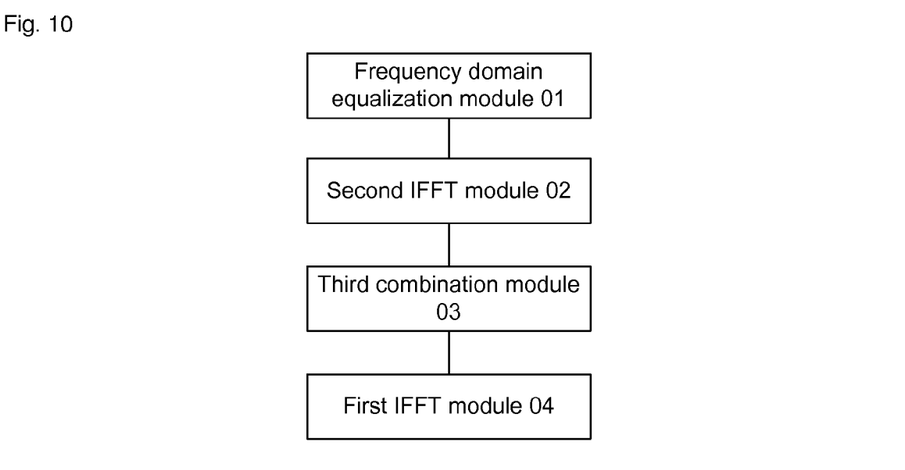
FIG. 10 is a schematic structural diagram of a receiver in a wireless communication system according to a fourth embodiment of the disclosure.

Accordingly, as shown in FIG. 10 and FIG. 13, the embodiment further provides a receiver in a wireless communication system, and the receiver includes:

a frequency-domain equalization module 01 configured to perform independent frequency-domain equalization on a received signal of an ith receiving antenna to obtain an equalized signal $s_k^{(i)}$;

a second IFFT module 02 configured to perform IFFT on the equalized signal $s_k^{(i)}$ to obtain a time domain signal $s_n^{(i)}$; and a third combination module 03 configured to perform Maximal-Ratio Combining (MRC) on the time domain signal $s_n^{(i)}$ in time domain according to an MRC principle using a formula below:

$$s_n = \sum_{i=1}^{L} b^{(i)} s_n^{(i)};$$

wherein $b^{(i)}$ is a weighted coefficient for combination.

In practical applications, the second IFFT module 02 and the third combination module 03 of the receiver in a wireless communication system may be implemented by a CPU, a DSP or an FPGA of the receiver in the wireless communication system; the frequency domain equalization module 01 may be implemented by a frequency domain equalizer.

What described are merely embodiments of the disclosure, and are not intended to limit the scope of protection of the disclosure. All equivalent structures and flow changes made using the specification and accompanying drawings of the disclosure, or direct or indirect applications of the disclosure to other related technical fields should be included within the scope of protection of the disclosure.

The invention claimed is:

1. A diversity combining method applied by a receiver in a wireless communication system, the method comprising:
   acquiring baseband signals of receiving channels corresponding to multiple receiving antennas; and
   combining, according to a Maximal-Ratio Combining (MRC) principle, the acquired baseband signals within an equalizer to obtain a diversity combined baseband signal with improved diversity gain by using a formula:

$$r_n = \sum_{i=1}^{L} SNR_i r_n^{(i)};$$

wherein $r_n$ represents the diversity combined baseband signal, $SNR_i$ represents a Signal Noise Ratio (SNR) of a received signal corresponding to an ith receiving antenna, and $r_n^{(i)}$ represents a baseband signal of a receiving channel corresponding to the ith receiving antenna.

2. The diversity combining method applied by a receiver in a wireless communication system according to claim 1, wherein the acquired baseband signals of the receiving channels corresponding to the multiple receiving antennas are baseband signals processed by matched filtering.

3. A receiver in a wireless communication system, comprising:

an equalizer configured to acquire baseband signals of receiving channels corresponding to multiple receiving antennas, and combine, according to a Maximal-Ratio Combining (MRC) principle, the acquired baseband signals to obtain a diversity combined baseband signal with improved, diversity gain by, using a formula:

$$r_n = \sum_{i=1}^{L} SNR_i r_n^{(i)};$$

wherein $r_n$ represents the diversity combined baseband signal, $SNR_i$ represents a Signal Noise Ratio (SNR) of a received signal corresponding to an ith receiving antenna, and $r_n^{(i)}$ represents a baseband signal of a receiving channel corresponding to the ith receiving antenna.

4. The receiver in a wireless communication system according to claim 3, further comprising:
   a filter configured to perform matched filtering processing on the baseband signals of the receiving channels corresponding to the multiple receiving antennas, which are acquired from a Radio Frequency (RF) front end, and transmit processed signals to the first combination module.

5. A diversity combining method applied by a receiver in a wireless communication system, the method comprising:
   performing intermediate frequency processing and matched filtering processing on a baseband signal of a receiving channel corresponding to an ith receiving antenna to obtain a time domain baseband signal $r_n^{(i)}$, wherein i=1, ..., L;
   performing Fast Fourier Transform (FFT) on $r_n^{(i)}$ to obtain a frequency domain signal $R_k^{(i)}$; and
   performing combination within a frequency-domain equalization module according to a Maximal-Ratio Combining (MRC) principle using below formula to obtain an FFT value $S_k$ of a transmitted symbol:

$$S_k = \sum_{i=1}^{L} c_k^{(i)} R_k^{(i)};$$

wherein $c_k^{(i)}$ is a coefficient when FFT is performed on the transmitted symbol, where an optimal coefficient is obtained according to a minimum error principle and using a formula below:

$$c_k^{(i)} = \frac{\left(\frac{\sigma_d}{\sigma_n^{(i)}}\right)^2 (H_k^{(i)})^*}{1 + \sum_{l=1}^{L} \left(\left(\frac{\sigma_d}{\sigma_n^{(l)}}\right)^2 |H_k^{(l)}|^2\right)};$$

wherein $H_k^{(i)}$ is a frequency domain response of a channel corresponding to the $i^{th}$ antenna; and wherein $\sigma_d/\sigma_n^{(i)}$ is a Signal to Interference plus Noise Ratio (SINR).

6. The diversity combining method applied by a receiver in a wireless communication system according to claim 5, the method further comprising:
   performing Inverse Fast Fourier Transform (IFFT) on $S_k$ to convert the frequency domain signal to the time domain signal, thus obtaining an equalized signal $s_n$.

7. A receiver in a wireless communication system, comprising:

a filter configured to perform intermediate frequency processing and matched filtering processing on a baseband signal of a receiving channel corresponding to an i th receiving antenna to obtain a time domain baseband signal $r_n^{(i)}$, wherein i=1, . . . , L;

a first FFT module configured to perform FFT on $r_n^{(i)}$ to obtain a frequency domain signal $R_k^{(i)}$; and a second combination module configured to perform combination within a frequency-domain equalization module according to a Maximal-Ratio Combining (MRC) principle using a formula below to obtain an FFT value $S_k$ of a transmitted symbol:

$$S_k = \sum_{i=1}^{L} c_k^{(i)} R_k^{(i)};$$

wherein $c_k^{(i)}$ is a coefficient when FFT is performed on the transmitted symbol, where an optimal coefficient is obtained according to a minimum error principle and using a formula below:

$$c_k^{(i)} = \frac{\left(\frac{\sigma_d}{\sigma_n^{(i)}}\right)^2 (H_k^{(i)})^*}{1 + \sum_{l=1}^{L}\left(\left(\frac{\sigma_d}{\sigma_n^{(l)}}\right)^2 |H_k^{(l)}|^2\right)};$$

wherein $H_k^{(i)}$ is a frequency domain response of a channel corresponding to the $i^{th}$ antenna; and wherein $\sigma_d/\sigma_n^{(l)}$ is a Signal to Interference plus Noise Ratio (SINR).

8. The receiver in a wireless communication system according to claim 7, further comprising:

a first IFFT module configured to perform IFFT on $S_k$ to convert the frequency domain signal to the time domain signal, thus obtaining an equalized signal $s_n$.

* * * * *